Dec. 11, 1928.

P. TROJANI ET AL 1,694,631

ELECTROMECHANICAL RECORDING AND CONTROLLING MACHINE

Filed Aug. 23, 1926  3 Sheets-Sheet 1

Inventors:
Pietro Trojani and
Corradino D'Ascanio,

Dec. 11, 1928.
1,694,631
P. TROJANI ET AL
ELECTROMECHANICAL RECORDING AND CONTROLLING MACHINE
Filed Aug. 23, 1926   3 Sheets-Sheet 2

Inventors:
Pietro Trojani and
Corradino D'Ascanio,

Dec. 11, 1928.

P. TROJANI ET AL

1,694,631

ELECTROMECHANICAL RECORDING AND CONTROLLING MACHINE

Filed Aug. 23, 1926  3 Sheets-Sheet 3

Inventors:
Pietro Trojani
and Corradino D'Ascanio,
by Langner, Parry, Card & Langner
Att'ys.

Patented Dec. 11, 1928.

1,694,631

UNITED STATES PATENT OFFICE.

PIETRO TROJANI AND CORRADINO D'ASCANIO, OF ROME, ITALY.

ELECTROMECHANICAL RECORDING AND CONTROLLING MACHINE.

Application filed August 23, 1926, Serial No. 131,094, and in Italy July 30, 1926.

The object of the present invention is to provide a machine arranged and constructed to record automatically the indices of documents and the like and to automatically identify and indicate the finding of a particular record made by the machine.

The machine according to the invention avoids the long, difficult, and often imperfect work of employees, which is now necessary to catalogue and trace data and documents in public or private offices such as in banks or the like, in connection with lists of lost or stolen drafts, of clients or of agents, in municipal offices in connection with lists of inhabitants of a town, in police offices for tracing the files of criminals, in the offices of insurance companies, in archives, libraries, and the like.

The invention is characterized by the fact that the work is carried out rapidly and in a most simple manner exclusively by mechanical and electric devices so that the operator need only register by the aid of a suitable keyboard, on a strip of paper or the like, by means of perforations, the data of a document to be recorded, viz, the data which will be later used to identify the document, and other perforations representing other data in connection with the document and having reference to a catalogue, journal, protocol, and archive, a liber, or the like. For instance, supposing a deed is to be recorded in the name of John Doe. An index book is kept containing a list of names relating to recorded documents among which is written the name of John Doe with certain symbols which will be represented by a certain arrangement of the perforations in the recording machine.

Certain keys or elements of the machine are then operated to perforate on the paper strip the symbol representing the name John Doe. Other keys are operated producing perforations adjacent those representing the name, and relating to a liber, correspondingly marked in which the deed will be recorded.

At a subsequent period, when it is desired to refer to the deed recorded by John Doe, only his name need be known. From the index or name book the key letters representing the arrangement of perforations which stands for John Doe, may be ascertained. The proper keys of the recording machine are then depressed as were used in recording the name John Doe. The machine is then set in motion and comes to a rest when the perforations previously made identify themselves with the positions of the said keys. By observing the paper strip, the operator will find adjacent the perforations, representing the name John Doe, the other perforations previously made referring to the liber in which the deed is recorded. These perforations for example, may be arranged in the order 1 dash 3. The back of the liber will be similarly designated. The machine has thus given information, identifying the liber in which the deed will be found recorded.

Thus, in general, when one wishes to ascertain whether a certain document has been registered by the machine, he repeats on the keyboard the data which identify it, and sets the machine in operation so as to cause the paper strip which carries identifying data, previously recorded, to be unwound in the machine. If the document was recorded, the machine will stop as soon as this record has been reached, and will give a signal by means of a lamp, a bell or in any other appropriate way, and it will thus be evident that the respective document or the name of the respective person was recorded on the strip.

In the drawings, in which a practically operative embodiment of the invention is disclosed.

Before referring. in detail to the several figures it may be stated that since the data for recording and identifying documents are generally composed of groups of numbers and letters, it is evident that the machine must, as a rule, comprise as many units as there are numbers and letters to be registered.

These units will all work in the same manner, while their structure might be slightly varied according to whether one single keyboard is to be used for all the characters, or one keyboard is to be used for the alphabet, and one keyboard for each group of 10 numbers.

In the drawings for the sake of clearness, only one unit relating to a number is shown, and the following specification is given only for the sake of explaining the invention and the scope for which it is intended, it being understood that the invention may be realized in many other ways without departing from the limits and purpose of the invention.

Figure 1:
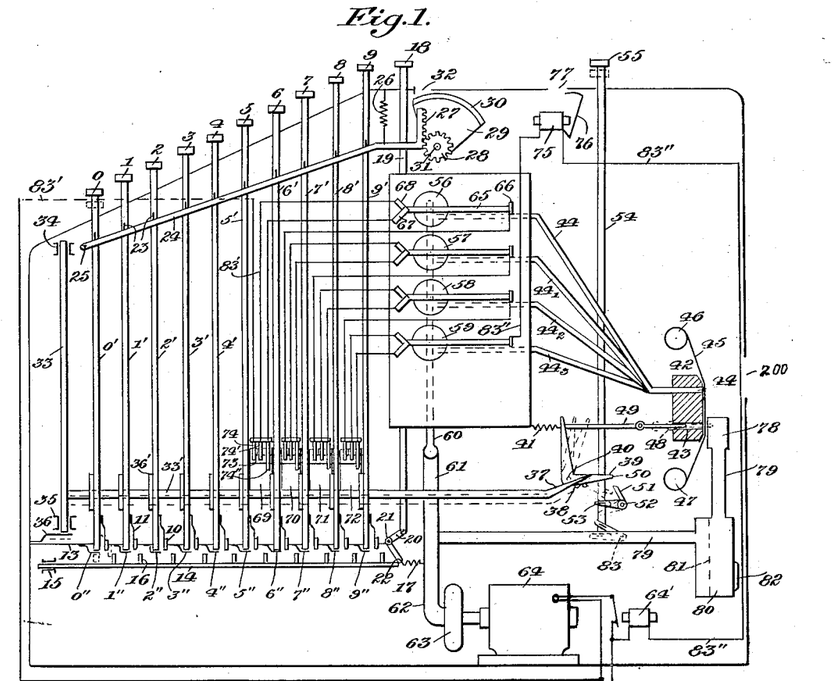
Figure 1 represents diagrammatically a section in a vertical plane of the main device of the recording machine.
Figures 2, 3:
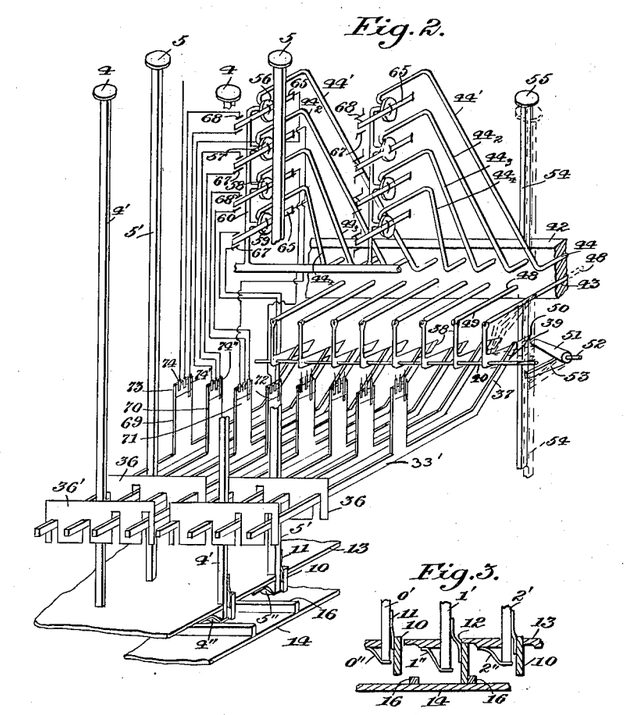
Figure 2 is a practical perspective view of the device taken in section transversely of the plate with which the paper strip cooperates.
Figure 3 is a detail in vertical section showing the supporting means for the bottom of the keys of the keyboard.

As shown in Figure 1, the device comprises a bank of keys 0, 1, 2, 3, 4, 5, 6, 7, 8, 9, carried by bars 0', 1', 2', 3', 4', 5', 6', 7', 8', 9' arranged to move longitudinally of the bars in appropriate guides. The keys are held in their normal position by means of springs 0'', 1'', 2'', 3'', 4'', 5'', 6'', 7'', 8'', 9''. and after being depressed they are locked in their lower position by locking noses 10 near the end of each bar. Each nose, for example. at the lower end of the bar 1', Figure 1, consists of a block which is secured to the bar by a spring 11 normally urging the block against the rim 12 (see Figure 3) or a hole provided for the passage of the bar. These holes are made in a plate 13. Figures 1 and 3, which is secured to the frame of the machine.

When a key is depressed the upper end of the respective block 10 engages below the edge of the rim 12 in the manner shown in connection with the bar 1' in Figure 3 so that the key remains in its depressed position. The keys may at any time be released, by means of a movable plate 14 arranged below the stationary plate 13 and adapted to slide in guides 15, Figure 1, said plate 14 being provided with a plurality of pins 16 which through the action of a tension spring 17 secured to the plate 14, are normally held away from the lower ends of such blocks as may be depressed. Motion may be imparted to the plate 14 against the action of the spring 17 through a key 18 and bar 19 which connect with a bell crank lever 20 pivoted at 21, the lower end of which bell crank lever is pivotally secured to the plate 14. By depressing the key 14, the bell crank lever 20 shifts the plate 14 bringing the pins 16 into coaction with any of the blocks 10 which may be interlocked with the respective edges of the holes in the plate 13, releasing the said blocks and causing the keys to rise to their normal positions through the urge of the springs 0'', 1'', etc., the ends of which underlie the lower ends of the bars 0', 1', etc.

Each bank of keys is provided with an indicator to show which keys have been depressed. This indicator may be constructed and arranged to work in any suitable manner and particularly in the manner indicated in Figure 1.

A pin 23 is provided on each key bar, projecting from the side thereof and bearing on the upper edge of a lever 24 which is fulcrumed at one end as at 25, to the frame of the machine. The lever 24 is normally held in contact with the pins 23 by means of the spring 26. The free end of the lever carries a rack 27 which is constantly in mesh with a pinion 28 to which is secured a segment-shaped indicator 29 whose curved rim 30 carries a scale of numbers from 0 to 9, identified with the keys in the bank of keys. The indicator segment may rotate about a pin 31 secured to the frame of the machine. The casing of the machine is provided with a window 32 into registry with which the numbers on said scale are brought, through operation of said indicator, for observation.

Since the pins 23 of the several bars of the bank of keys are at different distances from the axis of rotation of the lever 24, it is evident that when the keys are depressed, the angular displacement of the lever will vary according to which key has been depressed, and the indicator therefore will oscillate through varying angles, bringing different numbers into registry with the window 32 according to which of the keys has been depressed.

The indicator may of course be operated by any other suitable mechanical device controlled by the downward movement of the keys.

For each bank of keys there is further provided a member 33 adapted to slide in a vertical direction along guides 34 and 35 and being normally maintained in elevated position by means of a spring 36 pressing upwardly against its lower end. One of these members is shown in Figure 1, the other members of which there are preferably one to each bank of keys, being identical in construction, but in the position of parts shown in Figure 1, hidden behind the single member 33 which is shown. There will be four such members for each bank of keys for numbers, and five members for each bank of keys for letters, or they may be more numerous according to whether it is necessary or convenient. If there are four members it is possible to make the necessary combinations for the formation of the numbers from 0 to 9, while five members are sufficient for the combinations necessary for the formation of the twenty-six letters of the alphabet, and so on.

Near the end of each key bar, is provided a comblike member 36, between the teeth of which lie the horizontal arms 33′ of the members 33. The interstices between the teeth have a varying depth according to which key they belong, and by lowering the keys it is thus possible to lower the members 33′ one by one or in various groups according to the arrangement and depth of the said interstices.

Let it be supposed that the number 0 corresponds to the first member 33, 1 to the second, 2 to the third, 3 to the fourth, 4 to the group of the first and second numbers, 5 to the first and third, 6 to the first and fourth, 7 to the second and third, 8 to the second and fourth, 9 to the third and fourth, and let it also be supposed that the downward movement of a key is accompanied by a downward movement of the members 33 in agreement with the above described arrangement, in this case the bottom of the first and second interstices of the comblike members 36′ of the key 4 for example, will be in contact with the horizontal arms 33′ of the respective members 33 while the first and fourth interstices will have a sufficient depth to avoid producing a downward movement of the other two members.

Each member 33 bears at the end 37 of its horizontal arm 33′ against a pin 38 secured to one of the arms of a bell crank lever 39 which is fulcrumed at 40 to the frame of the machine, the pin 38 being held against the end 37 by a tension spring 41.

In front of the levers 39 and parallel to their axes of rotation 40 a plate 42 is arranged having rows of holes 42 and 44, each row comprising a number of holes equal to the entire number of the members 33 of the machine. The holes are preferably spaced apart at equal intervals, and the holes of one of these rows are arranged vertically above the corresponding holes of the other row.

The holes 43 receive slidable punches 48 which are connected to the levers 39 by means of rods 49. When now, the bell crank member 29 is rotated through the operation of a key, the punch advances in the hole 43 to a position of readiness, however, without touching the paper strip. A punch operating bar 54 is provided, actuated by a key 55, preferably forming part of the keyboard. Adjacent the lower end of the bar 54 is a shaft 52 on which is mounted a lever 51 operated by a lever 53 suitably connected to the bar 54. The end 50 of the arm 39 of the bell crank lever is normally out of the path of movement of the lever 51, but by depression of a key and the corresponding rocking of the bell crank lever by means of the engagement of the member 33′ of the pin 38, the said end 50 is brought into the path of movement of the lever. Then when the punching key 55 is depressed, the bell crank 40 which had previously placed the punch in position of readiness, is rocked still further by the lever 51 forcing the punch through the paper strip 45 which moves slidably against the plate 42, making a perforation. This perforation registers on the record strip the indications of the keys. When the punching key 55 has returned into its original position, or some other key is to be operated, the spool 47 is rotated through energizing of the circuit of the motor 125 by a suitable key actuated switch, not shown, bringing a fresh portion of the paper strip into registry with the punch apertures in the plate 42 so that a new record can be made on the paper strip.

The counter punches or dies are formed by a pipe 78 arranged near the paper strip on the opposite side and provided with holes registering with the apertures 43, into which the ends of the punches extend.

This pipe 78 is connected through a pipe 79 to an aspirator 63 which will hereinafter be described. The pipe 79 is widened out along a part of its length to form a chamber 18 which contains a filter screen 81. The suction produced by the aspirator draws all the small particles of paper cut out by the punches down into the chamber 80 from which they may be subsequently removed through a port 82. When the key 55 is operated to punch a hole in the paper strip, a valve 83 in the pipe 79, to which the bar 54 is operatively connected opens, so as to permit the passage of air through the pipe 79, producing the vacuum in the chamber 80 and the pipe 78.

The upper row of holes 44 is connected by means of pipes to an equal number of bellows. These bellows are arranged in groups of 4 for the numbers and in groups of 5 for the letters in agreement with the groups of the members 33. In Figure 1 a group of 4 bellows 56, 57, 58 and 59 is shown relating to banks of keys with numbers.

Each bellows communicates not only with one of the aforesaid pipes but also with a common pipe 60 which in turn communicates with a collector pipe 61, the latter terminating at the sucking mouth 62 of a centrifugal or other aspirator 63, suitably driven as by an electric motor 64.

The bellows 56 for example, is held expanded by a metal spring 65, fastened at 66. The opposite end of the spring 65 bears on and is electrically connected with a small metal blade 67. When the bellows contracts, the free end of the spring 65 moves away from the blade 67 and is brought to bear upon, and thus create an electric connection with a second blade 68.

The vacuum produced by the aspirator causes a contraction of the bellows when the holes 44 are closed, and the respective springs 65 will then contact electrically with the blades 68 while when any of the other of the holes 44 is open, the respective bellows will expand and the respective spring will electrically contact with the blade 67, the number and arrangement of the apertures opens to the bellows at any one time, being dependent upon the arrangement of holes previously made in the record strip 45.

Each member 33 has a lug secured to its horizontal arm 33', this lug being made of an electrically insulating material.

Figure 4:
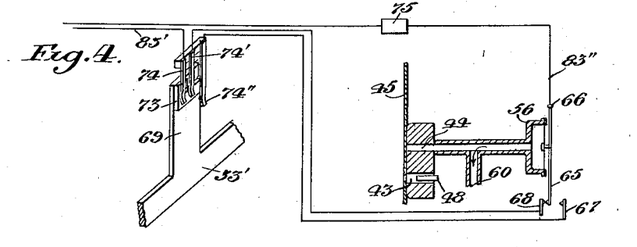
Figure 4 is a diagrammatic view partly in section and partly in perspective showing the arrangement of the switch elements.

Figure 1 shows these lugs 69, 70, 71 and 72, and Figure 4 shows the first mentioned of these lugs on an enlarged scale and in detail, said lugs each operating with one of the members 33' of the bank of keys shown in Figure 1.

Figure 7:
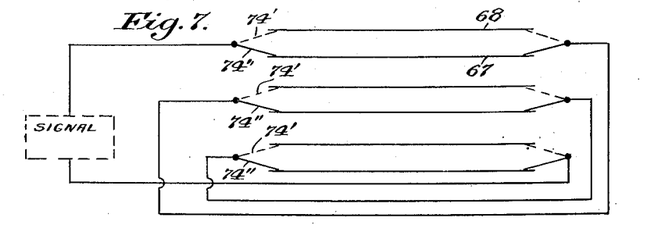
Figure 7 is a diagrammatic view of the electro-mechanically controlled switch circuits.

Each lug carries at its end a metallic block 73, clearly shown in Figure 4 which as shown is L-shaped having the broader portion engaged by a brush 74 with which it is constantly in contact throughout its slight range of vertical movement, and selectively in contact with other brushes 74' and 74", depending upon whether the lug 69 with the member 33' is in its elevated or depressed position. The brush 74, it will be observed from Figure 1, is in circuit with a source of current. The brushes 74' and 74" are at the ends of alternative circuit branches the other ends of which terminate in the blades 68 and 67 there being a number of pairs of these circuit branches as is shown in Figure 1, and more clearly in the diagrammatic showing of Figure 7. These branches are connected in series and the circuit is made or broken by the reversal in the position of any one of the brushes 74', 74" or any one of the blades 68 or 67 from one of its contacting positions to the other.

As has been indicated in the previous description, when the aspirator is working, all of the springs 65 are pulled downward by the contraction of the bellows upon which they are mounted, thus contacting with the plates 68; if the hole corresponding to the bellows 56 is then opened by registering with an aperture in the paper strip, and at the same time the lug 69 is lowered, the current will pass from the brush 74 to the plate 67 and thus to the spring 65.

After the keys corresponding to the data which are to be controlled, have been depressed, the spools carrying the record strip are set in motion and the aspirator is made to work. The record strip passes over the holes 44 and if the depressed keys coincide exactly with a record on the paper strip, the bellows corresponding to the lugs which have been depressed by the depression of the keys will be collapsed by the passage of corresponding apertures in the paper strip over the holes controlling said bellows so that the electric circuit is closed permitting the current to act through the wire 83" on an electromagnet 75, the armature 76 of which carries the indicator which is thereby moved through an appropriate angularity corresponding to the position of the depressed keys. The indicator may be observed through the window 77, and the data which it is desired to ascertain may be read directly from the paper strip through the window 200.

At the same time, the circuit of the motor 64 is broken through energization of the relay 64', the motor and aspirator driven thereby being thus stopped temporarily while the record on the paper strip remains coincident with the depressed keys.

In the event that a record on the paper strip is to be cancelled, it is sufficient to punch an additional hole in the strip adjacent the record to be cancelled. In this way, even in case the keys which have been depressed coincide with a record on the strip, the electric circuit controlling the aspirator and the signal operating electromagnet will remain open on account of the cancellation hole which causes the corresponding bellows to operate thus opening the switch contacts at that particular bellows without any corresponding circuit closing movement on the part of the lugs 69, 70, etc.

Figure 5:
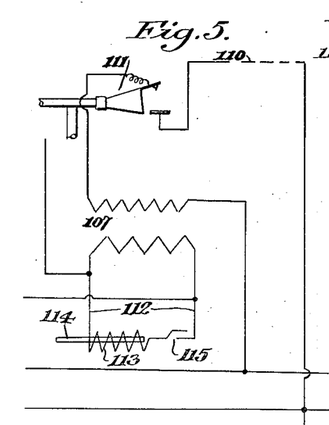
Figure 5 is a diagrammatic view of the auxiliary punch for making a cancellation hole.

The arrangement for punching a cancellation hole is shown in Figure 5 and comprises an additional bellows switch 111 which is inserted in series in the circuit 110 and communicates in the usual way by means of one tube with the aspirator, and by means of another tube with a channel provided in the plate in correspondence with one side of the paper strip, and also comprises an electric circuit 112 for the secondary of the transformer 107. In this circuit is inserted a solenoid 113 which controls a punch 114 and an interrupter key 115 which normally maintains the circuit open. The punch 114 serves to make a hole in the paper strip in accordance with the channel in the plate which communicates with the bellows 111.

When it is desired to cancel a registration made, it is sufficient to repeat on the keyboard the data of such registration and set the paper holding spools in motion. When the registration passes in front of the peripheral plate the machine produces the desired signal and the paper holding spools come to a standstill. In this way when the electric circuit is closed the transformer 107 will be energized, and when the key 115 is depressed the solenoid 113 will cause the punch 114 to act so as to produce an additional hole on the paper strip in correspondence with the registration to be cancelled. This hole will cause the bellows 111 to be contracted, and its electrical contacts will be separated so that the circuit 110 will be interrupted.

Figure 6:
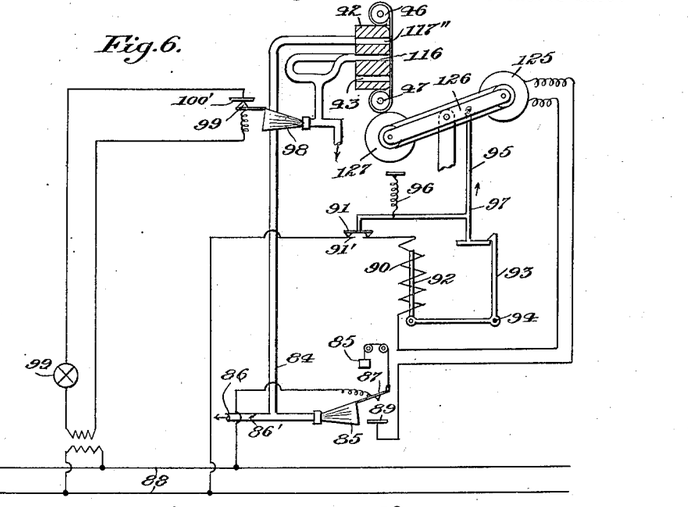
Figure 6 is a diagrammatic view in vertical section showing means for automatically stopping the travel of the paper strip at the termination of a working period of the machine as well as means for signalling a rent in a margin of the paper strip.

After having thus produced the additional hole in correspondence with the registration to be cancelled, each time such registration passes in front of the plate the bellows 111 will maintain the circuit interrupted, no signal will be given and the machine will continue its movement. Figure 6 shows diagrammatically electric circuits employed in the above described machine and in connection with various auxiliary devices intended to complete the working of the machine.

Means are provided for stopping the motion of the paper strip when any unusual interval elapses between the passage of successive records on the strip. Thus, the paper strip automatically comes to rest when the machine is disused for a few moments.

To effect this, each time a record is made by perforating the strip, an additional hole is made in the strip by the means of a punch which advances every time the perforation key is operated. To effect this function the plate 42 against which the paper strip slides is provided with an aperture 117′, which communicates with the pipe 84 or a bellows 85, see Figure 6. This bellows communicates with a pipe 86 which in turn is connected to the aspirator. The bellows 85 normally tends to remain expanded under the action of suitable means such as a counterweight 85′. This bellows carries a contact 87 permanently electrically connected to a wire of the main line 88. In operative proximity to the contact 87 is a fixed contact 89 engaged by the contact 87 when the bellows 85 is collapsed. The contact 89 is electrically connected to the opposite side of the main line 88 through a solenoid 90 and contacts 91 and 91′. A valve 86′ which in the present instance has the form of a butterfly valve may be positioned to regulate the rate of exhaustion of air from the bellows 85, and thus to control the speed of its movement. When the contacts 87 and 89 come together, that is to say, when the bellows 85 has collapsed, the solenoid 90 is traversed by electric current which causes it to act upon the armature 92 which, being drawn upward, produces a rotation of the crank lever 93 of its fulcrum 94 so as to disengage it from the rod 95 the lower angular end of which it normally engages. When the rod 95 is thus set free, it is drawn upward through the action of the spring 96 so that it moves in the direction shown by the arrow 97, interrupting the circuit of the solenoid 90 by raising the contacts 91. At the same time the rod 95 acts mechanically to break the driving connection of the motor which rotates the spool 47 upon which the paper strip is wound. Simple mechanism for performing this function is shown, the motor 125 being mounted upon one end of an oscillating frame 126, the opposite end of which has a friction drive wheel 127 engaging the spool 47 and being belted to the motor. The operation of the motor is also stopped by this circuit opening movement, the disengagement of the friction drive being provided for the purpose of instantly stopping the movement of the paper strip notwithstanding any possible inertia rotation of the motor after its current supply has been cut off. This automatic strip stopping arrangement works in the following way. When the spool carrying the paper strip, and the aspirator, are at work, the bellows 85 tends to collapse just as long as the pipe 84 is closed by the paper strip. But as the successive records on the strip are all accompanied by an additional perforation which during the rotation of the spool passes in front of the apertures 117′, the bellows 85 will be open to atmosphere every single time a record passes the aperture 117″ so that the bellows does not have a chance to collapse, its pressure being continually renewed.

The valve 86 may be so adjusted as to bring about this result so that the interval between two successive records is not sufficient to permit the bellows 85 to collapse. Consequently, while records are passing the aperture 117″, the contacts 87 and 89 will not close and the solenoid circuit remains open so that the rotation of the motor and paper strip continues.

But as soon as the records are finished, no more of the holes in the paper strip pass before the aperture 117″, so that air is no longer supplied to the bellows 85, which under the influence of the vacuum of the aspirator collapses, brings the contacts 87 and 89 together, operating the solenoid, stopping the motor 125 and disengaging its friction drive from the paper carrying spool.

The additional punching which accompanies each record and which coacts with the aperture 117″ is produced in the following manner.

Below the aperture 117″ but in longitudinal alignment therewith with respect to the movement of the paper strip, the plate 42 is provided with a punch carrying aperture 117′ in which is mounted the punch 117. On the same shaft 40 which carries the bell crank levers 39 by which the record making punches are operated, is an additional bell crank lever 39′, shown in Figure 9. On the same shaft 52 with the arms 51, is an additional arm 51′.

Figures 8, 9:
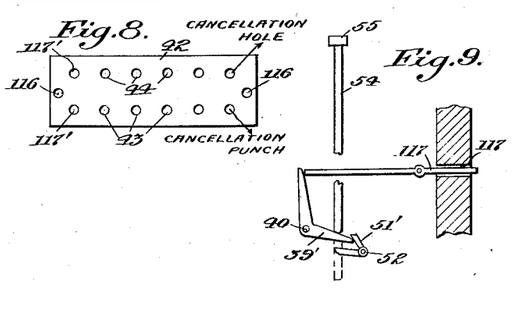
Figure 8 is a front view of the plate with which the paper strip cooperates, and should be read particularly in connection with Figure 6.
Figure 9 is a fragmentary view in vertical elevation showing the means for invariably making a perforation. for each recording act of the machine, which perforations cooperate in performing the motor stopping function referred to in connection with Figure 6.
Figure 10:
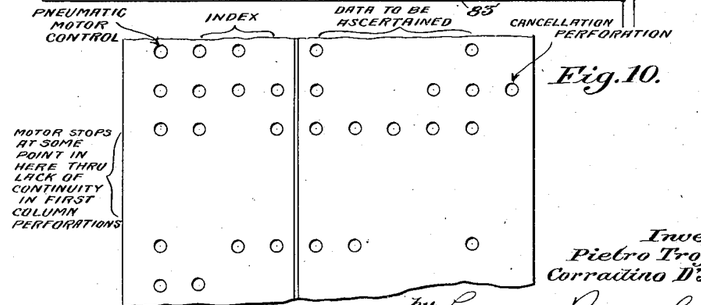
Fig. 10 is a front elevation of a fragment of the perforated strip, showing perforations for performing the several functions as herein described.

Unlike the levers 39, the ends 50 of which are normally beyond the path of engagement of the arm 51 and only brought into said path by a preliminary setting movement produced by the depression of the keys of the keyboard, the bell crank 39′ is always in the path of movement of the arm 51′, the latter being actuated by the key 55 and bar 54 which is in common with the record punching bell crank levers. Consequently, when the key 55 is depressed the arm 51 invariably oscillates the bell crank lever 39′ so as to actuate the punch 117. Thus this punching is invariably made in contradistinction to the actuation of the normal record forming punches which are operated by a bar 54 and key 55 only when the bell cranks 39 have been preliminarily set into operative relation to the arms 51.

It sometimes happens that through accident or long use a rent appears in one or the other of the sides of the paper strip. This should be mended at once or the paper strip will tear clear across, rendering the entire device inoperative. In order to signal a rent in either or both borders of the record strip there is provided an additional bellows 98, which is connected to an electric signalling circuit comprising a signalling device 99 and the secondary of a transformer 100 the primary of which is connected across the main line 88.

The bellows 98 communicates through a pipe 98″ with the aspirator, and through a branched pipe with two special apertures 116 and 116′ formed in the plate 42 adjacent the opposite borders of the paper strip.

So long as the paper strip is sound the apertures 116 and 116′ remain permanently closed so that the bellows 98 remains normally collapsed through the continuous evacuation of the aspirator. With this position the electric contacts 99′ and 100′ remain apart keeping the signal circuit open and the signal inactive but should a rent appear in either border of the paper strip, air will be led into the bellows 98 permitting the same to expand and closing the contacts thus energizing the indicator through induced energy provided by the transformer.

It is apparent that while a practical device has been disclosed in the above specification taken in connection with the drawings yet at the same time it is to be understood that numerous alterations, changes or substitutions may be made in the various elements as shown, without departing from the spirit of the invention.

What we claim is:

1. An electro-mechanical machine for recording and identifying documents through perforated symbols on a registration strip, comprising a circuit provided in a plurality of places serially located with respect to said circuit with pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a key board having keys selectively manipulable to set certain switch elements of one group in their operative position, and simultaneously to set corresponding punches in preliminary position, means for actuating such punches as are in preliminary position, and means selectively responsive to perforation combinations on said strip for setting switch elements of the second group which correspond with the set switch elements of the first group, into circuit-closing relation.

2. An electro-mechanical machine for recording and identifying documents through perforated symbols on a registration strip, comprising a circuit provided in a plurality of places serially located with respect to said circuit with pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a key board having keys selectively manipulable to set certain switch elements of one group in their operative position, and simultaneously to set corresponding punches in preliminary position, means for actuating such punches as are in the preliminary position, and a plurality of bellows, to the movements of which the switch elements of the second group are responsive, said bellows having pipes in operative proximity to said registration strip, said bellows being selectively responsive to the venting action permitted by the registration of certain perforation combinations on said strip with the pipes of said bellows, for setting switch elements of the second group which correspond with the set switch elements of the first group, into circuit-closing position.

3. An electro-mechanical machine for recording and identifying documents through perforated symbols on a registration strip, comprising a circuit provided in a plurality of places serially located with respect to said circuit, with pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact wth the same limb, a plurality of punches for perforating said registration strip, a key board having keys selectively manipulable to set certain switch elements of one group in their operative position, and simultaneously to set corresponding punches in preliminary position, means for actuating such punches as are in the preliminary position, and a plurality of bellows to the movements of which the switch elements of the second group are responsive, a blower with which said bellows are in communication, said bellows having pipes in operative proximity to said registration strip, said bellows being selectively responsive to the venting action permitted by the registration of certain perforation combinations on said strip with the pipes of said bellows, for setting switch elements of the second group which correspond with the set switch elements of the first group, into to circuit-closing position.

4. An electro-mechanical machine for recording and identifying documents through perforated symbols on a registration strip, comprising a circuit provided in a plurality of places serially located with respect to said circuit with pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a key board having keys selectively manipulable to set certain switch elements of one group in their operative position, and simultaneously to set corresponding punches in preliminary position, means for actuating such punches as are in the preliminary position, and a plurality of bellows to the movements of which the switch elements of the second group are responsive, springs for said bellows, normally biasing them into an expanded position, an aspirator with which said bellows are in communication, said bellows having pipes in operative proximity to said registration strip and occluded by the imperforate parts thereof to permit the bellows to be collapsed by said aspirator against the tension of said springs, said bellows being selectively permitted to expand, through the venting action permitted by the registration of certain perforation combinations on said strip with the pipes of said bellows, for setting switch elements of the second group which correspond with the set switch elements of the first group, into circuit-closing position.

5. An electro-mechanical machine for recording and identifying documents through perforated symbols on a registration strip, comprising a circuit provided in a plurality of places serially located with respect to said circuit with pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a plurality of common means for setting switch elements of one group, with which said means are associated, in their operative position, and simultaneously to set corresponding punches in preliminary position, means for actuating such punches as are in the preliminary position, a key board having keys selectively manipulable to actuate said means, and means selectively responsive to perforation combinations on said strip for setting switch elements of the second group which correspond with the set switch elements of the first group, into circuit-closing relation.

6. An electro-mechanical machine for recording and identifying documents through perforated symbols on a registration strip, comprising a circuit provided in a plurality of places serially located with respect to said circuit with pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a plurality of common means for setting switch elements of one group, with which said means are associated, in their operative position, and simultaneously to set corresponding punches in preliminary position, means for actuating such punches as are in the preliminary position, a key board having keys selectively manipulable to actuate said means, and a plurality of bellows, to the movements of which the switch elements of the second group are responsive, said bellows having pipes in operative proximity to said registration strip, said bellows being selectively responsive to the venting action permitted by the registration of certain perforation combinations on said strip with the pipes of said bellows, for setting switch elements of the second group which correspond with the set switch elements of the first group, into circuit-closing position 7. An electro-mechanical machine for recording and identifying documents through perforated symbols on a registration strip, comprising a circuit provided in a plurality of places serially located with respect to said circuit witth pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a plurality of common means for setting switch elements of one group, with which said means are associated, in their operative position, and simultaneously to set corresponding punches in preliminary position, means for actuating such punches as are in the preliminary position, lugs in fixed relation to said means and movable therewith, the switch elements of said first group being carried by said lugs.

8. An electro-mechanical machine for recording and identifying documents through perforated symbols on a registration strip, comprising a circuit provided in a plurality of places serially located with respect to said circuit with pairs of parallel limbs forming alternative current paths, two groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a key board having keys selectively manipulable to set certain switch elements of one group in their operative position, and simultaneously to set corresponding punches in preliminary position, means for actuating such punches as are in the preliminary position, means selectively responsive to perforation combinations on said strip for setting switch elements of the second group which correspond with the set switch elements of the first group, into circuit-closing relation, and a cancellation device including an additional punch, means for actuating said punch at will for putting an additional perforation in said registration strip beside any symbol which it is desired to cancel, and a bellows having a switch element in circuit-breaking relation to said circuit, responsive to air pressure through said additional perforation, to break said circuit and prevent the indication by said device of identification of the symbol.

9. An electro-mechanical machine for recording and identifying documents through perforated symbols on a registration strip, comprising a circuit provided in a plurality of places serially located with respect to said circuit with pairs of parallel limbs forming alternative current paths, groups of independently movable switch elements connected to the circuit terminals adjacent the ends of said pairs, adapted to make contact with one or the other of said limbs, to close said circuit when both switch elements associated with a pair of limbs are in contact with the same limb, a plurality of punches for perforating said registration strip, a key board having keys selectively manipulable to set certain switch elements of one group in their operative position, and simultaneously to set corresponding punches in actuatable position, means selectively responsive to perforation combinations on said strip for setting switch elements of the second group which correspond with the set switch elements of the first group, into circuit-closing relation, and a strip stopping device including a slow acting bellows having a switch element arranged as a circuit breaker in the motor circuit of said strip, said bellows being connected to said aspirator and having a pipe adapted to communicate with a perforation in each symbol, said bellows becoming fully collapsed to break the motor circuit when occluded by the imperforate part of said strip for a period of time relatively longer than the period of time between the passage of successive symbols.

In testimony whereof I have signed at Rome this 4th day of August, 1926.
PIETRO TROJANI.

In testimony whereof I have signed at Rome this 8th day of August, 1926.
CORRADINO D'ASCANIO.